L. SCHULTZ.

Ruffers for Sewing-Machines.

No. 5,793. Reissued March 17, 1874.

Witnesses:
A. H. Norris.
Jos. C. Widman.

Inventor.
Louis Schultz.
per Van Santvoord & Wright.
Attys.

AM. PHOTO-LITHOGRAPHIC Co. N.Y. (OSBORNE'S PROCESS.)

UNITED STATES PATENT OFFICE.

LOUIS SCHULTZ, OF COLLEGE POINT, NEW YORK.

IMPROVEMENT IN RUFFLERS FOR SEWING-MACHINES.

Specification forming part of Letters Patent No. 146,462, dated January 13, 1874; reissue No. 5,793, dated March 17, 1874; application filed February 12, 1874.

*To all whom it may concern:*

Be it known that I, LOUIS SCHULTZ, of College Point, in the county of Queens and State of New York, have invented a new and useful Improvement in Rufflers for Sewing-Machines; and I do hereby declare the following to be a full, clear, and exact description thereof, which will enable those skilled in the art to make and use the same, reference being had to the accompanying drawing forming part of this specification, in which drawing—

Figure 1:
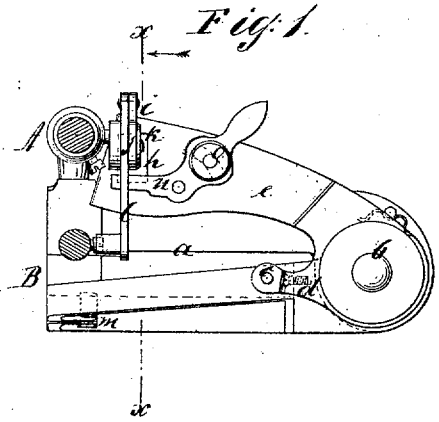
Figure 2:
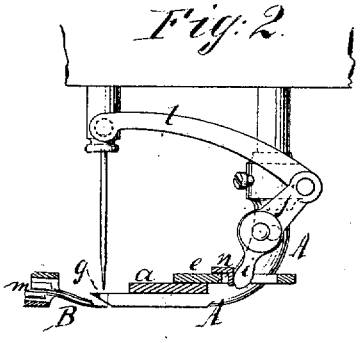

Figure 1 represents a plan or top view of my invention. Fig. 2 is a transverse section of the same in the plane *x x*, Fig. 1.

Similar letters indicate corresponding parts.

This invention consists of two jaws pivoted upon an arm projecting from the presser-foot of a sewing-machine, and made to oscillate on said pivoted bearing, and open and close as the needle-bar reciprocates, through the medium of a bell-crank lever, that has its fulcrum on the pivoted bearing of the jaws; further, in providing the oscillating jaws with supporting-lips to carry the band which is to be sewed to the plaited or ruffled material; also, in combining with the ruffling device a double hemmer, so that the edges of the band are tucked under, while the material to which the band is to be sewed is ruffled—all one operation—and that the band when sewed to the ruffled material presents a finished appearance.

Figure 3:
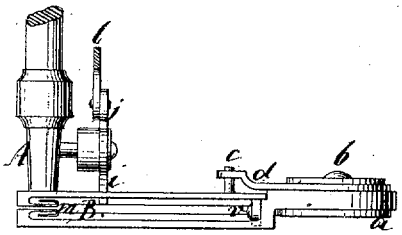

In the drawing, the letter A designates the presser-foot of a sewing-machine, which is fastened to the presser-bar in the usual manner. From this presser-foot extends an arm, *a*, which forms the bearing for a pivot, *b*, that forms the fulcrum for the nippers B. From the upper jaw of these nippers rises a stud, *c*, which engages with one arm, *d*, of a bell-crank lever, *d e*, that has its fulcrum on the pivot *b*, so that, by imparting to said bell-crank lever an oscillating motion, the nippers B are caused to swing toward and from the presser-foot A. The jaws of the nippers are made of spring-steel, and the upper jaw is connected to the lower jaw by a pivot, *v*, Fig. 3, so that, by turning it on the pivot, it will open or close. As the nippers recede, the pressure of the lever *d* on the stud *c* causes the upper jaws to open, and, as the nippers advance, the upper jaw is caused to shut down upon the lower jaw, and the material placed between them is compelled to advance with said nippers. The outer end of the presser-foot is beveled off underneath, to allow the jaws of the nippers to pass under the same, and said jaws are provided with recesses, which pass under the needle-hole or throat *g* of the presser-foot, so as to allow the needle to descend, while the material, which is held between said jaws, is presented to the action of the needle. The bell-crank lever *d e* is provided with a slot, *h*, through which extends one arm, *i*, of a bell-crank lever, *i j*, that has its fulcrum on a pivot, *k*, secured in the shank of the presser-foot. From the arm *j* of this bell-crank lever extends a rod, *l*, which is connected to the needle-bar, so that, as the needle-bar moves up and down, an oscillating motion is imparted to the bell-crank lever *i j*, and this motion is communicated through the bell-crank lever *d e* to the nippers B. In the slot *h* projects a lever, *n*, which turns on a set-screw, *o*. By moving this lever forward or backward in said slot the amount of motion imparted to the bell-crank lever *d e* can be increased or diminished, and by these means the size of the ruffles or plates can be regulated. When the needle-bar rises the nippers are caused to advance toward the needle, and the material retained between said nippers is pushed forward, and, since the same is prevented from advancing by the needle-thread, it is compelled to form a plait or ruffle, and it is retained in this position, by the combined action of the presser-foot and of the nippers, until the needle has penetrated through the material and fastened the same in the required position. If it is desired to sew the plaited material to a band, I double up the band and place one part on the upper and the other on the lower jaw of the nippers, and as the sewing operation progresses the plaited material is fastened between the band. For the purpose of supporting the two parts of the band I have provided lips *m* on the nippers, and in order to produce a finished seam I make these supporting-lips in the form of hemming-guides, so that both edges of the band are tucked under as the same passes to the sewing mechanism, and the process of hemming, ruffling, and sewing the double-hemmed band to the plaited or ruffled material is carried on in one operation. It must also be remarked that the mechanism for imparting motion to the ruffling-nippers is situated behind said jaws, so that the materials which are to be ruffled and hemmed can be fed and guided without obstruction.

I do not broadly claim the employment of two jaws combined with the presser-foot of a sewing-machine, said jaws converging toward each other at the end nearest the presser-foot, and operated to retain and carry the material lying between them during their forward movement, and in their backward movement slip over the same, for such is not my invention.

What I claim as new, and desire to secure by Letters Patent, is—

1. The jaws B, pivoted upon the plate *a*, and made to oscillate thereon and open and close as the needle-bar reciprocates, by means of the bell-crank levers *i j* and *d e*, stud *c*, and lever *l* connected with the needle-bar, all constructed and arranged in the combination herein shown and described.

2. The nippers B, having the lips *m* for supporting a band during the operation of sewing the same to the ruffled material, in combination with the plate *a*, bell-crank levers *i j* and *d e*, and the lever *l*, connected with the needle-bar, substantially as described.

3. The combination of ruffling-blades, operating substantially as described, with double hemmers or lips *m* adapted to move back and forth with said blades in front of the presser-foot, and serving to tuck under both edges of a band which is to be sewed to the plaited material, essentially as specified.

L. SCHULTZ.

Witnesses:
W. HAUFF,
JAMES L. NORRIS.